United States Patent
Okada et al.

(10) Patent No.: US 10,300,914 B2
(45) Date of Patent: May 28, 2019

(54) CONTROL DEVICE FOR ALL-WHEEL-DRIVE VEHICLE

(71) Applicant: SUBARU CORPORATION, Tokyo (JP)

(72) Inventors: Takahiro Okada, Tokyo (JP); Naoyuki Akiyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/829,377

(22) Filed: Dec. 1, 2017

(65) Prior Publication Data
US 2018/0222481 A1    Aug. 9, 2018

(30) Foreign Application Priority Data

Feb. 9, 2017    (JP) ................................. 2017-021873

(51) Int. Cl.
*B60W 10/06*        (2006.01)
*B60K 17/04*        (2006.01)
(Continued)

(52) U.S. Cl.
CPC ............. *B60W 30/18* (2013.01); *B60K 17/04* (2013.01); *B60W 10/02* (2013.01); *B60W 10/06* (2013.01);
(Continued)

(58) Field of Classification Search
None
See application file for complete search history.

(56) References Cited

U.S. PATENT DOCUMENTS

| 4,858,496 A | * | 8/1989 | Iwatsuki | ............... B60W 30/18 |
| | | | | 477/33 |
| 5,564,519 A | * | 10/1996 | Katoh | ............... B60K 17/356 |
| | | | | 180/197 |

(Continued)

FOREIGN PATENT DOCUMENTS

| JP | H 08-29681 B2 | 3/1996 |
| JP | 2009-208732 A | 9/2009 |
| JP | 2010-264840 A | 11/2010 |

OTHER PUBLICATIONS

JPO Decision of Grant dated Oct. 2, 2018, and English Translation thereof.

(Continued)

*Primary Examiner* — Colby M Hansen
(74) *Attorney, Agent, or Firm* — McGinn IP Law Group, PLLC

(57) ABSTRACT

An AWD-vehicle control device includes a transfer clutch that adjusts a driving force, a detector that detects a steering angle of a steering wheel, a detector that detects an accelerator pedal opening, a detector that detects a vehicle speed, a detector that detects an engine revolution speed, a detector that detects a turbine revolution speed of a torque converter, and a transfer clutch controller that adjusts hydraulic pressure supplied to the transfer clutch and controls a coupling force of the transfer clutch. If a predetermined period has passed from the accelerator pedal opening becoming less than a predetermined opening, the vehicle speed is within a predetermined range, a deviation between the engine and turbine revolution speeds is less than a predetermined speed, and the steering angle is equal to a first predetermined angle or greater, the transfer clutch controller controls the hydraulic pressure to reduce the coupling force.

16 Claims, 5 Drawing Sheets

(51) Int. Cl.
*B60W 30/18* (2012.01)
*B60W 10/02* (2006.01)
*B60W 10/107* (2012.01)
*F16D 48/06* (2006.01)
*F16H 61/02* (2006.01)
*F16H 59/18* (2006.01)
*F16H 59/44* (2006.01)
*F16H 59/58* (2006.01)
*F16H 59/36* (2006.01)

(52) U.S. Cl.
CPC ......... *B60W 10/107* (2013.01); *F16D 48/066* (2013.01); *F16H 61/0204* (2013.01); *B60W 2510/0283* (2013.01); *B60W 2510/0638* (2013.01); *B60W 2510/20* (2013.01); *B60W 2520/10* (2013.01); *B60W 2540/10* (2013.01); *B60W 2540/18* (2013.01); *B60W 2710/021* (2013.01); *B60W 2710/06* (2013.01); *B60W 2710/0644* (2013.01); *B60W 2710/1005* (2013.01); *B60W 2720/403* (2013.01); *F16D 2500/1026* (2013.01); *F16D 2500/1045* (2013.01); *F16D 2500/10431* (2013.01); *F16D 2500/3067* (2013.01); *F16D 2500/3108* (2013.01); *F16D 2500/3144* (2013.01); *F16H 59/18* (2013.01); *F16H 59/44* (2013.01); *F16H 59/58* (2013.01); *F16H 2059/366* (2013.01); *Y02T 10/76* (2013.01)

(56) References Cited

U.S. PATENT DOCUMENTS

| | | | |
|---|---|---|---|
| 7,497,285 B1* | 3/2009 | Radev | B60W 20/13 180/65.225 |
| 2005/0027402 A1* | 2/2005 | Koibuchi | B60W 50/00 701/1 |
| 2009/0227421 A1 | 9/2009 | Saito | |
| 2011/0297460 A1* | 12/2011 | Chess | B62D 11/08 180/6.66 |

OTHER PUBLICATIONS

Japanese Office Action dated Jun. 19, 2018 in corresponding Japanese Patent Application No. 2017-021873, with a machine English translation.

* cited by examiner

FIG. 4

| | STEERING ANGLE | | |
|---|---|---|---|
| | ⇐ SMALL | 360 | LARGE ⇒ |
| VEHICLE SPEED<br>LOW ⇕ HIGH | . . . . . . . . . . . . . .<br>. . . . . . . . . . . . . .<br>. . TARGET TRANSFER CLUTCH PRESSURE . .<br>. . ⇐ LOW          HIGH ⇒ . .<br>. . ⎛FIRST TARGET⎞ ⎛SECOND TARGET⎞ . .<br>. . ⎜ HYDRAULIC ⎟ ⎜ HYDRAULIC ⎟ . .<br>. . ⎝ PRESSURE ⎠ ⎝ PRESSURE ⎠ . .<br>. . . . . . . . . . . . . .<br>. . . . . . . . . . . . . . | | |

FIG. 5

| | STEERING ANGLE | |
|---|---|---|
| | ⇐ SMALL | LARGE ⇒ |
| ACCELERATOR PEDAL OPENING<br>SMALL ⇕ LARGE | . . . ⇑ . . .<br>. . . SMALL . . .<br>. . . TARGET-HYDRAULIC-PRESSURE CHANGE . . .<br>. . . LIMITATION AMOUNT UPON TERMINATION . . .<br>. . . LARGE . . .<br>. . . ⇓ . . .<br>. . . . . . . . . . . . . .<br>. . . . . . . . . . . . . .<br>. . . . . . . . . . . . . . | |

FIG. 6

| | | STEERING ANGLE | | |
|---|---|---|---|---|
| | | ⇐ SMALL | 360 | LARGE ⇒ |
| VEHICLE SPEED | LOW ↑ HIGH ↓ | . . . . . . . . . . . . .<br>. . . . . . . . . . . . .<br>. . . . . . . . . .<br>. . . . . . . . . .<br>. . . . . . . . . .<br>. . . . . . . . . .<br>. . . . . . . . . .<br>. . . . . . . . | | ↑<br>LOW<br><br>IDLE UP<br>REVOLUTION SPEED<br><br>HIGH<br>↓ |

FIG. 7

| VEHICLE SPEED (km/h) | 0 | ⇐ LOW | HIGH ⇒ |
|---|---|---|---|
| DELAY PERIOD (sec) | | ⇐ SHORT | LONG ⇒ |

CONTROL DEVICE FOR ALL-WHEEL-DRIVE VEHICLE

CROSS-REFERENCE TO RELATED APPLICATIONS

The present application claims priority from Japanese Patent Application No. 2017-021873 filed on Feb. 9, 2017, the entire contents of which are hereby incorporated by reference.

BACKGROUND

1. Technical Field

The present invention relates to a control device for an all-wheel-drive vehicle.

2. Related Art

All-wheel-drive (AWD) (or four-wheel-drive (4WD)) vehicles that exhibit good traveling performance on steep slope roads, bumpy roads, slippery roads (e.g., snowy and muddy roads), etc. have been widely used. As for AWD vehicles, a full-time system and a part-time system are known. In the part-time system, two-wheel drive and four-wheel drive are switched between when needed. The full-time system implements four-wheel drive all the time by disposing a center differential between the front and rear wheels and allowing for a revolution speed difference between the front and rear wheels. On the other hand, the part-time system includes, for example, main drive wheels directly coupled to the engine and driven wheels (sub driving wheels) coupled to the engine through a transfer clutch. The part-time system controls the coupling force of the transfer clutch in accordance with conditions such as a road surface condition and a traveling condition so as to adjust distribution of a driving force to the driven wheels and to switch between two-wheel drive and four-wheel drive.

Japanese Examined Patent Application Publication (JP-B) No. 8-29681 discloses a 4WD-vehicle control method for reducing rattling noise of a driveline (rattling noise due to abutting of gear teeth) produced when reversal of torque (reversal of torque from a reverse drive state to a drive state) occurs in response to shifting of an accelerator-pedal off state to an accelerator-pedal on state. More specifically, according to this control method, in the case where a distribution ratio of torque to the front and rear wheels is adjusted by changing an engaging force of a friction engagement device, if a throttle opening is less than or equal to a predetermined opening, control is performed to increase the engaging force of the friction engagement device so that the driving states of the front and rear wheels approach the directly coupled state.

According to this control method, since the friction engagement device such as a torque distribution control clutch engages to produce a lockup state in response to a decrease in the throttle opening, rattling noise of the driveline is successfully reduced even if the accelerator-pedal off state is shifted to the accelerator-pedal on state and consequently reversal of torque occurs while the vehicle is traveling.

As described above, according to the 4WD-vehicle control method disclosed in JP-B No. 8-29681, it is possible to reduce rattling noise of the driveline (rattling noise due to abutting of gear teeth) produced when reversal of torque (reversal of torque from the reverse drive state to the drive state) occurs in response to shifting of the accelerator-pedal off state to the accelerator-pedal on state. However, if the engaging force of the friction engagement device (transfer clutch) is increased in a state where the accelerator pedal is released (in the accelerator-pedal off state), abnormal noise (rattling noise) may be produced by gears of the driveline depending on the traveling state of the vehicle.

It is desirable to provide a control device for an all-wheel-drive vehicle including a transfer clutch that adjusts a driving force transferred from an automatic transmission to a driven-wheel-side driveline, the control device being capable of reducing abnormal noise (rattling noise) that may be produced by gears of the driveline in a state where an accelerator pedal is released (in an accelerator-pedal off state).

After careful examinations of the issue described above, the inventors have obtained the following knowledge. In a state where the accelerator pedal is released (in an off state) and toque applied to a gear of a driveline (for example, a secondary reduction drive/driven gear) is substantially zero (that is, the backlash of the gear is reduced toward neither the drive side nor the coast side), if an electromagnetic valve (solenoid valve) for adjusting hydraulic pressure is driven to increase the coupling force of the transfer clutch because a difference in revolution speed occurs between the front wheels and the rear wheels in response to steering on a steering wheel, transfer torque of the transfer clutch fluctuates due to hydraulic pressure fluctuation (hydraulic vibration) based on the driving frequency of the electromagnetic valve. As a result, the gear of the driveline (for example, the secondary reduction drive/driven gear) vibrates, producing gear rattling noise (abnormal noise).

SUMMARY OF THE INVENTION

An aspect of the present invention provides a control device for an all-wheel-drive vehicle, the control device including a transfer clutch configured to adjust a driving force transferred from an automatic transmission to a driven-wheel-side driveline, a steering angle detector configured to detect a steering angle of a steering wheel, an accelerator pedal opening detector configured to detect an opening of an accelerator pedal, a vehicle speed detector configured to detect a vehicle speed, an engine revolution speed detector configured to detect an engine revolution speed, a turbine revolution speed detector configured to detect a turbine revolution speed of a torque converter, and a transfer clutch controller configured to adjust hydraulic pressure supplied to the transfer clutch by driving an electromagnetic valve on a basis of a vehicle operation state and control a coupling force of the transfer clutch. In such a control device, in a case where first conditions that a predetermined period has passed from the opening of the accelerator pedal becoming less than a predetermined opening, the vehicle speed is within a predetermined speed range, a deviation between the engine revolution speed and the turbine revolution speed is less than a predetermined revolution speed, and the steering angle of the steering wheel is greater than or equal to a first predetermined angle are met, the transfer clutch controller controls the hydraulic pressure to reduce the coupling force of the transfer clutch compared with a coupling force in a case where at least one of the first conditions is not met.

Another aspect of the present invention provides a control device for an all-wheel-drive vehicle including a transfer clutch configured to adjust a driving force transferred from an automatic transmission to a driven-wheel-side driveline, the control device including a steering angle detector configured to detect a steering angle of a steering wheel, an accelerator pedal opening detector configured to detect an opening of an accelerator pedal, a vehicle speed detector configured to detect a vehicle speed, an engine revolution speed detector configured to detect an engine revolution speed, a turbine revolution speed detector configured to detect a turbine revolution speed of a torque converter, and a controller configured to perform adjustment to make the engine revolution speed greater than the turbine revolution speed in a case where third conditions that a predetermined period has passed from the opening of the accelerator pedal becoming less than a predetermined opening, the vehicle speed is within a predetermined speed range, a deviation between the engine revolution speed and the turbine revolution speed is less than a predetermined revolution speed, and the steering angle of the steering wheel is greater than or equal to a first predetermined angle are met.

Another aspect of the present invention provides a control device for an all-wheel-drive vehicle including a transfer clutch configured to adjust a driving force transferred from an automatic transmission to a driven-wheel-side driveline, a steering angle detector configured to detect a steering angle of a steering wheel, an accelerator pedal opening detector configured to detect an opening of an accelerator pedal, a vehicle speed detector configured to detect a vehicle speed, an engine revolution speed detector configured to detect an engine revolution speed, a turbine revolution speed detector configured to detect a turbine revolution speed of a torque converter, and circuitry configured to adjust hydraulic pressure supplied to the transfer clutch by driving an electromagnetic valve on a basis of a vehicle operation state and control a coupling force of the transfer clutch. In a case where conditions that a predetermined period has passed from the opening of the accelerator pedal becoming less than a predetermined opening, the vehicle speed is within a predetermined speed range, a deviation between the engine revolution speed and the turbine revolution speed is less than a predetermined revolution speed, and the steering angle of the steering wheel is greater than or equal to a first predetermined angle are met, the circuitry controls the hydraulic pressure to reduce the coupling force of the transfer clutch compared with a coupling force in a case where at least one of the first conditions is not met.

Another aspect of the present invention provides a control device for an all-wheel-drive vehicle including a transfer clutch configured to adjust a driving force transferred from an automatic transmission to a driven-wheel-side driveline. The control device includes a steering angle detector configured to detect a steering angle of a steering wheel, an accelerator pedal opening detector configured to detect an opening of an accelerator pedal, a vehicle speed detector configured to detect a vehicle speed, an engine revolution speed detector configured to detect an engine revolution speed, a turbine revolution speed detector configured to detect a turbine revolution speed of a torque converter, and circuitry configured to perform adjustment to make the engine revolution speed greater than the turbine revolution speed in a case where conditions that a predetermined period has passed from the opening of the accelerator pedal becoming less than a predetermined opening, the vehicle speed is within a predetermined speed range, a deviation between the engine revolution speed and the turbine revolution speed is less than a predetermined revolution speed, and the steering angle of the steering wheel is greater than or equal to a first predetermined angle are met.

BRIEF DESCRIPTION OF THE DRAWINGS

FIG. 4 is a diagram illustrating an example of a target transfer clutch pressure map;

FIG. 5 is a diagram illustrating an example of an upon-termination target-hydraulic-pressure change limitation amount map;

FIG. 6 is a diagram illustrating an example of an idle up revolution speed map; and FIG. 7 is a diagram illustrating an example of a table of a delay period since an accelerator pedal is set in an off state.

DETAILED DESCRIPTION

Figure 1:
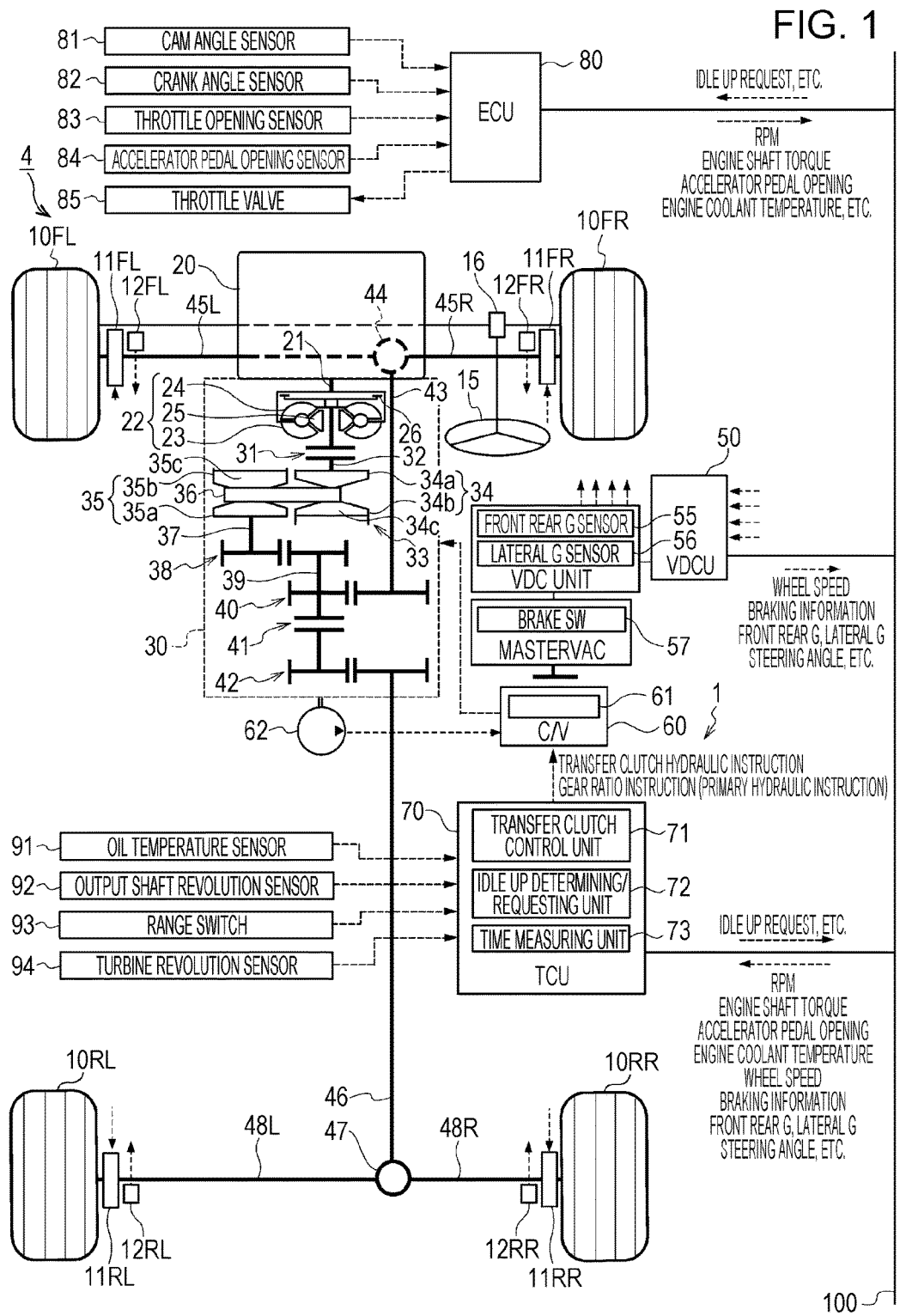
FIG. 1 is a block diagram illustrating overall configurations of an AWD-vehicle control device according to an example and a powertrain and a drivetrain of an AWD vehicle equipped with the AWD-vehicle control device.

Examples of the present invention will be described in detail below with reference to the accompanying drawings. Note that the same reference signs are used for parts that are identical or equivalent to each other in the drawings. In addition, the same or substantially the same components are denoted by the same reference signs in the drawings to omit a duplicated description.

First, a configuration of an AWD-vehicle control device 1 according to an example will be described with reference to FIG. 1. FIG. 1 is a block diagram illustrating a configuration of the AWD-vehicle control device 1 (hereinafter, also simply referred to as the control device 1) and configurations of a powertrain and a drivetrain of an AWD vehicle 4 equipped with the control device 1. The AWD vehicle 4 according to the example is a part-time AWD vehicle equipped with a continuously variable transmission (CVT) 30. More particularly, the AWD vehicle 4 is a front-engine-front-drive-(FF)-based part-time AWD vehicle.

An engine 20 may be of any type. For example, the engine 20 is a horizontally-opposed four-cylinder direct-injection gasoline engine. In the engine 20, air taken in from an air cleaner (not illustrated) is controlled in terms of an amount by an electronically controlled throttle valve (hereinafter, also simply referred to as a "throttle valve") 85 disposed at an intake pipe, passes through an intake manifold, and is taken into each cylinder of the engine 20. The amount of air taken in from the air cleaner is detected by an air flowmeter. Further, a throttle opening sensor 83 that detects an opening of the throttle valve 85 is disposed at the throttle valve 85. Each cylinder has an injector that injects the fuel. In addition, each cylinder has a spark plug that ignites a fuel-air mixture and an ignitor-included coil that applies a high voltage to the spark plug. In each cylinder of the engine 20, a mixture of the taken-in air and the fuel injected by the injector is ignited by the spark plug to combust. The exhaust gas produced by the combustion is discharged through an exhaust pipe.

In addition to the air flowmeter and the throttle opening sensor 83 mentioned above, a cam angle sensor 81 that distinguishes between the cylinders of the engine 20 is disposed in the vicinity of a camshaft of the engine 20. In addition, a crank angle sensor 82 that detects the position of a crankshaft is disposed in the vicinity of a crankshaft of the engine 20. These sensors are connected to an engine control unit (hereinafter, abbreviated as "ECU") 80 (described later). In addition, various sensors such as an accelerator pedal opening sensor 84 that detects a depression amount of the accelerator pedal, that is, an opening of an accelerator pedal, and a coolant temperature sensor that detects a temperature of the coolant of the engine 20 are connected to the ECU 80. In one implementation, the accelerator pedal opening sensor 84 serves as an "accelerator pedal opening detector" recited in the claims.

An output shaft (crankshaft) 21 of the engine 20 is coupled to the CVT 30 with a torque converter 22 and a forward-reverse travel switching mechanism 31 interposed therebetween. The torque converter 22 has a clutch function and a torque amplification function. The CVT 30 converts and outputs a driving force supplied thereto from the engine 20. In one implementation, the CVT 30 serves as an "automatic transmission" recited in the claims.

The torque converter 22 is constituted mainly by a pump impeller 23, a turbine runner 24, and a stator 25. The pump impeller 23 coupled to the output shaft 21 produces a flow of oil, and the turbine runner 24 opposing the pump impeller 23 receives the driving force produced by the engine 20 through the oil to drive an output shaft. The stator 25 located between the pump impeller 23 and the turbine runner 24 regulates an exit flow (returning) from the turbine runner 24 and then returns the flow to the pump impeller 23 to produce the torque amplification effect.

The torque converter 22 is also equipped with a lockup clutch 26 that makes the input and the output in a directly coupled state. When the input and the output are not coupled by the lockup clutch 26 (are in a non-lockup state), the torque converter 22 performs torque amplification on the driving force produced by the engine 20 and transfers the torque to the CVT 30. When the input and the output are coupled by the lockup clutch 26 (are in a lockup state), the torque converter 22 transfers the driving force produced by the engine 20 directly to the CVT 30. A revolution speed of the turbine runner 24 (turbine revolution speed) that constitutes the torque converter 22 is detected by a turbine revolution sensor 94. The detected turbine revolution speed is output to a transmission control unit (hereinafter, abbreviated as "TCU") 70 (described later).

The forward-reverse travel switching mechanism 31 switches between forward revolution and reverse revolution of driving wheels (forward traveling and backward traveling of the AWD vehicle 4). The forward-reverse travel switching mechanism 31 includes mainly a double-pinion planetary gear train (not illustrated), a forward clutch, and a reverse brake. The forward-reverse travel switching mechanism 31 is capable of switching a path along which the driving force produced by the engine 20 is transferred, by controlling the states of the forward clutch and the reverse brake.

The CVT 30 includes a primary shaft 32 coupled to the turbine shaft (output shaft) of the torque converter 22 with the forward-reverse travel switching mechanism 31 interposed therebetween, and a secondary shaft 37 disposed in parallel to the primary shaft 32. A primary pulley 34 is provided at the primary shaft 32. The primary pulley 34 includes a fixed pulley 34a joined to the primary shaft 32, and a movable pulley 34b provided to oppose the fixed pulley 34a such that the movable pulley 34b can slide in an axis direction of the primary shaft 32. The primary pulley 34 is able to change an interval between the V-shaped surfaces of the fixed pulley 34a and the movable pulley 34b, that is, a pulley groove width. On the other hand, a secondary pulley 35 is provided at the secondary shaft 37. The secondary pulley 35 includes a fixed pulley 35a joined to the secondary shaft 37 and a movable pulley 35b provided to oppose the fixed pulley 35a such that the movable pulley 35b can slide in an axis direction of the secondary shaft 37, and is able to change the pulley groove width.

A chain 36 for transferring the driving force is put around the primary pulley 34 and the secondary pulley 35. The gear ratio is changed in a non-step manner by changing the groove widths of the primary pulley 34 and the secondary pulley 35 and changing a ratio (pulley ratio) between diameters of the chain 36 around the primary pulley 34 and the secondary pulley 35. Now, let Rp denote the diameter of the chain 36 around the primary pulley 34 and Rs denote the diameter of the chain 36 around the secondary pulley 35. Then, the gear ratio i is represented as i=Rs/Rp. Thus, the gear ratio i is determined by dividing a revolution speed Np of the primary pulley 34 by a revolution speed Ns of the secondary pulley 35 (i=Np/Ns).

The primary pulley 34 (the movable pulley 34b) has a hydraulic chamber 34c, and the secondary pulley 35 (the movable pulley 35b) has a hydraulic chamber 35c. The groove widths of the primary pulley 34 and the secondary pulley 35 are set/changed by adjusting a primary hydraulic pressure applied to the hydraulic chamber 34c of the primary pulley 34 and a secondary hydraulic pressure applied to the hydraulic chamber 35c of the secondary pulley 35.

The secondary shaft 37 of the CVT 30 is coupled to a countershaft 39 with a reduction gear 38 constituted by a pair of gears (a reduction drive gear and a reduction driven gear) interposed therebetween. The driving force converted by the CVT 30 is transferred to the countershaft 39 through the reduction gear 38. The countershaft 39 is coupled to a front driveshaft 43 with a counter gear 40 constituted by a pair of gears (a counter drive gear and a counter driven gear) interposed therebetween. The driving force transferred to the countershaft 39 is transferred to a front differential 44 through the counter gear 40 and the front driveshaft 43. The front differential 44 is, for example, a bevel gear differential. The driving force from the front differential 44 is transferred to a front left wheel 10FL through a front left wheel driveshaft 45L and to a front right wheel 10FR through a front right wheel driveshaft 45R.

At a subsequent stage of the counter gear 40 (counter drive gear) on the countershaft 39 described above, a transfer clutch 41 that adjusts the driving force to be transferred to a rear differential 47 is disposed. A coupling force (that is, a torque distribution ratio to rear wheels (driven wheels) 10RL and 10RR) of the transfer clutch 41 is controlled in accordance with the four-wheel drive state (for example, slipping states of the front wheels 10FL and 10FR) and the engine torque, for example. Thus, the driving force transferred to the countershaft 39 is distributed in accordance with the coupling force of the transfer clutch 41 and is transferred to the rear wheels 10RL and 10RR.

More specifically, the rear end of the countershaft 39 is coupled to a propeller shaft 46 that extends toward the vehicle rear side, with a transfer gear 42 constituted by a pair of gears (a transfer drive gear and a transfer driven gear) interposed therebetween. Thus, the driving force transferred to the countershaft 39 and then adjusted (distributed) by the transfer clutch 41 is transferred to the rear differential 47 from the transfer gear 42 (the transfer driven gear) through the propeller shaft 46.

The rear differential 47 is coupled to a rear left wheel driveshaft 48L and a rear right wheel driveshaft 48R. The driving force from the rear differential 47 is transferred to the rear left wheel 10RL through the rear left wheel driveshaft 48L and to the rear right wheel 10RR through the rear right wheel driveshaft 48R.

As a result of the drivetrain of the powertrain being configured as described above, if a select lever of transmission is operated to a D range, for example, the engine driving force is input to the primary shaft 32 of the CVT 30. The driving force converted by the CVT 30 is output from the secondary shaft 37 and is transferred to the front driveshaft 43 through the reduction gear 38, the countershaft 39, and the counter gear 40. Then, the driving force is distributed to the left and right sides by the front differential 44 and is transferred to the front left and right wheels 10FL and 10FR, respectively. Thus, the front left and right wheels 10FL and 10FR, respectively, are driven whenever the AWD vehicle 4 is in a traveling state.

On the other hand, part of the driving force transferred to the countershaft 39 is transferred to the propeller shaft 46 through the transfer clutch 41 and the transfer gear 42. If a predetermined clutch torque is applied to the transfer clutch 41, the driving force distributed according to the clutch torque is output to the propeller shaft 46. Then, the driving force is transferred also to the rear left and right wheels 10RL and 10RR, respectively, through the rear differential 47. In this way, the AWD vehicle 4 exhibits a function of an FF-based part-time AWD vehicle.

The wheels 10FR, 10FL, 10RR, and 10RL (hereinafter, also collectively referred to as wheels 10) are equipped with brakes 11FR, 11FL, 11RR, and 11RL (hereinafter, also collectively referred to as brakes 11) that brake the wheels 10FR, 10FL, 10RR, and 10RL, respectively. The wheels 10FR, 10FL, 10RR, and 10RL are also equipped with wheel speed sensors 12FR, 12FL, 12RR, 12RL (hereinafter, also collectively referred to as wheel speed sensors 12) that detect wheel revolution speeds, respectively.

In this example, disc brakes are used as the brakes 11. Each of the brakes 11 includes a brake disc attached to the corresponding wheel 10 of the AWD vehicle 4 and a brake caliper including a brake pad and a wheel cylinder. During braking, the brake pad is hydraulically pressed against the brake disc, and the resultant friction force brakes the wheel 10 coupled to the brake disc. Although the brakes 11 used in this example are disc brakes, brakes of another type such as drum brakes each of which performs braking by pressing a friction material against the inner circumferential surface of the drum may be used.

The wheel speed sensors 12 are contactless sensors each detecting a change in a magnetic field produced by a rotor (gear rotor or magnetic rotor) that rotates together with the corresponding wheel 10. For example, semiconductor sensors that detect the rotation of the rotor by using a Hall element or a magnetoresistive element are suitably used. In one implementation, each of the wheel speed sensors 12 serves as a "vehicle speed detector" recited in the claims.

This AWD vehicle 4 is also equipped with a vehicle dynamics control (VDC) unit (hereinafter, abbreviated as "VDCU") 50 for preventing skidding and achieving a good traveling stability when the vehicle enters a corner at an over speed or when the orientation (behavior) of the vehicle is disturbed by an abrupt steering operation, for example. Details of the VDCU 50 will be described later.

The hydraulic pressures allowing the CVT 30 to change the speed, that is, the primary hydraulic pressure and the secondary hydraulic pressure described above, are controlled by a valve body (control valve) 60. The valve body 60 opens/closes, by using a spool valve and a solenoid valve (electromagnetic valve) for moving the spool valve, an oil channel formed in the valve body 60 to adjust the hydraulic pressures of the oil ejected from an oil pump 62 and supply the oil to the hydraulic chamber 34c of the primary pulley 34 and the hydraulic chamber 35c of the secondary pulley 35. Likewise, the valve body 60 opens/closes, by using a spool valve and a solenoid valve (electromagnetic valve) 61 for moving the spool valve, an oil channel formed in the valve body 60 to adjust the hydraulic pressure of the oil ejected from the oil pump 62 and applies hydraulic pressure for coupling/releasing each clutch to the transfer clutch 41. As the solenoid valve 61 for adjusting the hydraulic pressure supplied to the transfer clutch 41, a duty solenoid capable of controlling a driving amount in accordance with a duty ratio of an applied voltage or the like is used.

Speed change control of the CVT 30 is performed by the TCU 70. Specifically, the TCU 70 controls driving of the solenoid valve (electromagnetic valve) of the valve body 60 described above to adjust the hydraulic pressures supplied to the hydraulic chamber 34c of the primary pulley 34 and the hydraulic chamber 35c of the secondary pulley 35 and consequently change the gear ratio of the CVT 30. Likewise, the TCU 70 controls driving of the solenoid valve 61 of the valve body 60 described above to adjust the hydraulic pressure supplied to the transfer clutch 41 and consequently adjust the distribution ratio of the driving force to be transferred to the rear wheels 10RL and 10RR.

As described above, the speed change control of the CVT 30 and the coupling/resealing control (driving force distribution control) of the transfer clutch 41 are performed by the TCU 70. The TCU 70 is interconnected to the ECU 80 that integrally controls the engine 20 and the VDCU 50 via a controller area network (CAN) 100, for example, to as to be able to perform communication with each other.

Each of the TCU 70, the ECU 80, and the VDCU 50 includes a microprocessor that performs computation, a read-only memory (ROM) that stores a program causing the microprocessor to execute each process, a random access memory (RAM) that stores various kinds of data such as computation results, a backup RAM storing content using a battery, an input/output interface (I/F), etc.

The ECU 80 determines a cylinder from an output of the cam angle sensor 81 and determines the engine revolution speed from a change in the revolution position of the crankshaft detected based on the output of the crank angle sensor 82. That is, in one implementation, the crank angle sensor 82 serves as an "engine revolution speed detector" recited in the claims. In addition, the ECU 80 obtains various kinds of information such as an amount of intake air, an accelerator pedal opening, an air-fuel ratio of the air-fuel mixture, a coolant temperature on the basis of detection signals input thereto from the various sensors described above. Then, the ECU 80 integrally controls the engine 20 by controlling an amount of injected fuel, ignition timing, and various devices, such as the throttle valve 85, on the basis of the obtained various kinds of information.

In addition, in response to a request (idle up request) for increasing the engine revolution speed (idle revolution speed) received from the TCU 70 via the CAN 100, the ECU 80 increases the opening of the electronically controlled throttle valve 85 (that is, increases an amount of intake air) in accordance with the request to increase the engine revolution speed (idle revolution speed) (to perform an idle up operation). Note that details of the request (idle up request) for increasing the engine revolution speed (idle revolution speed) will be described later.

The ECU 80 also transmits various kinds of information such as the engine coolant temperature (coolant temperature), the accelerator pedal opening, the engine revolution speed, and the engine shaft torque to the TCU 70 via the CAN 100.

To the VDCU 50, sensors such as the four wheel speed sensors 12FL, 12FR, 12RL, and 12RR, a steering angle sensor 16, a front rear acceleration (front rear G) sensor 55, a lateral acceleration (lateral G) sensor 56, and a brake switch 57 are coupled. As described above, the wheel speed sensors 12FL, 12FR, 12RL, and 12RR detect revolution states of the wheels 10FL, 10FR, 10RL, and 10RR by detecting revolutions of gear wheels attached at the respective centers of the wheels 10FL, 10FR, 10RL, and 10RR by using a magnetic pickup or the like, respectively. The front rear acceleration sensor 55 detects a front-rear-direction acceleration (hereinafter, also simply referred to as "acceleration") applied to the AWD vehicle 4. The lateral acceleration sensor 56 detects a lateral-direction acceleration applied to the AWD vehicle 4. In addition, the steering angle sensor 16 detects steered angles of the front wheels 10FL and 10FR which are steered wheels (that is, a steering angle of a steering wheel 15) by detecting a rotation angle of the pinion shaft. In one implementation, the steering angle sensor 16 serves as a "steering angle detector" recited in the claims.

The VDCU 50 brakes the AWD vehicle 4 by driving a brake actuator in accordance with an operation amount (depressed amount) of the brake pedal. The VDCU 50 also detects the behavior of the vehicle by using various sensors (for example, the wheel speed sensors 12, the steering angle sensor 16, the acceleration sensors 55 and 56, and a yaw rate sensor) and performs brake control and torque control of the engine 20 by automatically increasing the hydraulic pressures so as to suppress skidding and ensure the vehicle stability during cornering. That is, the VDCU 50 prevents skidding and achieves a good traveling stability when the vehicle enters a corner at an over speed or when the orientation (behavior) of the vehicle is disturbed by an abrupt steering operation or the like. More specifically, the VDCU 50 detects the vehicle orientation (behavior) or the like by using the aforementioned sensors and automatically performs control in accordance with a driving state. For example, upon determining oversteer, the VDCU 50 brakes the front wheel 10FL or 10FR located on the outer side of the corner. Conversely, upon determining understeer, the VDCU 50 performs control to reduce the engine power and to brake the rear wheel 10RL or 10RR located on the inner side of the corner. Note that the VDCU 50 has a function of an anti-lock braking system (ABS) and a function of a traction control system (TCS) in addition to the VDC (skidding prevention) function.

The VDCU 50 transmits the detected wheel speeds of the wheels 10, steering angle, front rear acceleration, lateral acceleration, and braking information to the TCU 70 via the CAN 100.

To the TCU 70, the aforementioned turbine revolution sensor 94, an oil temperature sensor 91 that detects a temperature of the oil of the CVT 30, an output shaft revolution sensor 92 that detects the revolution speed of the secondary shaft (output shaft) 37, and a range switch 93 that detects a selected position of the select lever of transmission are coupled.

As described above, the TCU 70 receives information such as the wheel speeds of the wheels 10, the steering angle, the forward rear acceleration, the lateral acceleration, and the braking information from the VDCU 50 via the CAN 100. The TCU 70 also receives information such as the engine coolant temperature (coolant temperature), the accelerator pedal opening, the engine revolution speed, and the engine shaft torque (output torque) from the ECU 80 via the CAN 100.

The TCU 70 automatically changes the gear ratio in a non-step manner on the basis of the driving state (for example, the accelerator pedal opening and the vehicle speed) of the AWD vehicle 4 by using a gear ratio map. The gear ratio map is stored in a ROM of the TCU 70.

In addition, the TCU 70 performs transfer clutch control (driving force distribution control) on the basis of various kinds of information obtained from the various sensors described above. A state is assumed where the accelerator pedal is released (is in an off state) and toque applied to a gear of a driveline (for example, the reduction drive/driven gear of the reduction gear 38) is substantially zero (that is, the backlash of the gear is reduced toward neither the drive side nor the coast side). In such a case, if the solenoid valve (duty solenoid) 61 for adjusting hydraulic pressure is driven to increase the coupling force of the transfer clutch 41 because a difference in revolution speed occurs between the front wheels 10FL and 10FR and the rear wheels 10RL and 10RR in response to steering on the steering wheel 15, transfer torque of the transfer clutch 41 fluctuates due to hydraulic pressure fluctuation (hydraulic vibration) according to the driving frequency of the solenoid valve (duty solenoid) 61. As a result, the gear of the driveline (for example, the reduction drive/driven gear of the reduction gear 38) vibrates, producing rattling noise (abnormal noise) in some cases.

Accordingly, the TCU 70 has a function of reducing the abnormal noise (rattling noise) that can be produced by the gear of the driveline included in the CVT 30 in the state where the accelerator pedal is released (in the off state). Thus, the TCU 70 includes a transfer clutch control unit 71, an idle up determining/requesting unit 72, and a time measuring unit 73 in terms of its functionality. In the TCU 70, as a result of a microprocessor executing a program stored in a ROM or the like, the functions of the transfer clutch control unit 71, the idle up determining/requesting unit 72, and the time measuring unit 73 are implemented.

The time measuring unit 73 measures a period from the opening of the accelerator pedal becoming less than a predetermined opening. That is, the time measuring unit 73 measures a period from when the accelerator pedal is released (is set in the accelerator-pedal off state). The period obtained by the time measuring unit 73 is output to the transfer clutch control unit 71.

The transfer clutch control unit 71 controls the coupling force of the transfer clutch 41 (that is, the driving force distribution ratio to the rear wheels 10RL and 10RR) in real time on the basis of the driving state (for example, the four-wheel drive state and the engine torque) of the AWD vehicle 4. That is, in one implementation, the transfer clutch control unit 71 serves as a "transfer clutch controller" recited in the claims.

In particular, if predetermined abnormal noise (rattling noise) occurrence conditions are met, the transfer clutch control unit 71 performs a transfer clutch pressure reduction process. More specifically, if conditions (first conditions) that (1) a predetermined period (approximately several seconds, for example) has passed from when the opening of the accelerator pedal has become less than a predetermined opening (0.6 degrees, for example), (2) the speed (vehicle speed) of the AWD vehicle 4 is within a predetermined speed range (is greater than or equal to a first predetermined speed (8 km/h, for example) and is less than a second predetermined speed (20 km/h, for example)), (3) a deviation (absolute value) between the engine revolution speed and the turbine revolution speed is less than a predetermined revolution speed (150 rpm, for example), and (4) the steering angle of the steering wheel 15 is greater than or equal to a first predetermined angle (250 degrees, for example) are met, the transfer clutch control unit 71 drives the solenoid valve 61 to adjust the hydraulic pressure (transfer clutch pressure) supplied to the transfer clutch 41 so that the coupling force of the transfer clutch 41 decreases compared with the coupling force in the case (ordinary case) where at least one of the conditions is not met. That is, for example, in a state where the accelerator pedal is released and torque applied to the gear of the driveline is substantially equal to zero (that is, the backlash of the gear is reduced toward neither the drive side nor the coast side), if a difference in revolution speed occurs between the front wheels 10FL and 10FR and the rear wheels 10RL and 10RR in response to steering on the steering wheel 15, the transfer clutch control unit 71 adjusts (reduces) the hydraulic pressure to reduce the coupling force of the transfer clutch 41.

In addition, when adjusting the hydraulic pressure to reduce the coupling force of the transfer clutch 41, if the steering angle of the steering wheel 15 is greater than or equal to a second predetermined angle (360 degrees, for example) that is greater than the first predetermined angle, the transfer clutch control unit 71 reduces a reduction amount of the hydraulic pressure of the transfer clutch 41 as the steering angle increases.

The period (delay period) taken for determining the period that has passed from when the opening of the accelerator pedal has become less than the predetermined opening (the accelerator-pedal off state) is set in accordance with the vehicle speed. More specifically, a map (delay period table) that determines a relationship between the vehicle speed (km/h) and the period (delay period) (sec) is stored in a ROM or the like of the TCU 70. This delay period table is searched on the basis of the vehicle speed, and the delay period is obtained.

FIG. 7 illustrates an example of the delay period table. In the delay period table, a delay period is given for each vehicle speed. As illustrated in FIG. 7, the delay period table is set such that the delay period increases as the vehicle speed increases. In addition, the delay period is set to be relatively short in a range where abnormal noise (rattling noise) occurs. Note that the delay period is provided to avoid the start of an abnormal noise reduction process (the transfer clutch pressure reduction process) in an operation range where a deviation (absolute value) between the engine revolution speed and the turbine revolution speed becomes less than the predetermined revolution speed for the first time after the opening of the accelerator pedal has become less than the predetermined opening (after the accelerator pedal has been set in the off state).

In addition, a target transfer clutch pressure (hereinafter, also simply referred to as "target hydraulic pressure") that is set when the above-described abnormal noise (rattling noise) occurrence conditions are met is set in accordance with the vehicle speed (km/h) and the steering angle (degrees). More specifically, a map (target transfer clutch pressure map) that determines a relationship among the vehicle speed (km/h), the steering angle (degrees), and the target transfer clutch pressure (MPa) is stored in the ROM or the like of the TCU 70. This target transfer clutch pressure map is searched on the basis of the vehicle speed and the steering angle, and the target transfer clutch pressure is obtained.

FIG. 4 illustrates an example of the target transfer clutch pressure map. In FIG. 4, the horizontal axis (row) represents the steering angle (degrees), and the vertical axis (column) represents the vehicle speed (km/h). In the target transfer clutch pressure map, a target transfer clutch pressure is given for each combination (lattice point) of the vehicle speed and the steering angle. In the target transfer clutch pressure map, an ordinary value (ordinary target hydraulic pressure that is not reduced) is set in a range outside the range (conditions) in which the transfer clutch pressure reduction process is to be performed (for example, a range where the vehicle speed is less than 8 km/h or is greater than or equal to 20 km/h, the steering angle is less than 250 degrees or is greater than or equal to 420 degrees). On the other hand, within the range (conditions) in which the transfer clutch pressure reduction process is to be performed (for example, in a range in which the vehicle speed is greater than or equal to 8 km/h and is less than 20 km/h and the steering angle is greater than or equal to 250 degrees and is less than 420 degrees), a first target hydraulic pressure that is lower than the ordinary value (ordinary target hydraulic pressure) is set in a range in which the steering angle is greater than or equal to 250 degrees and is less than 360 degrees, for example. In addition, a second target hydraulic pressure that is higher than the first target hydraulic pressure but is lower than the normal value (ordinary target hydraulic pressure) is set in a range in which the steering angle is greater than or equal to 360 degrees and is less than 420 degrees, for example. Note that the second target hydraulic pressure is set such that it increases as the steering angle increases. The transfer clutch control unit 71 adjusts the coupling force of the transfer clutch 41 (that is, the rear wheel distribution ratio) on the basis of the obtained target hydraulic pressure.

When finishing (terminating) the process (transfer clutch pressure reduction process) for controlling the hydraulic pressure to reduce the coupling force of the transfer clutch 41, the transfer clutch control unit 71 increases an amount (increase) by which the hydraulic pressure (target hydraulic pressure) to be supplied to the transfer clutch 41 is returned per unit time as the opening of the accelerator pedal increases.

More specifically, a map (upon-termination target-hydraulic-pressure change limitation amount map) that determines a relationship among the accelerator pedal opening (degrees), the steering angle (degrees), and a change amount limitation of the target transfer clutch pressure upon termination (MPa/s) is stored in the ROM or the like of the TCU 70. This upon-termination target-hydraulic-pressure change limitation amount map is searched on the basis of the accelerator pedal opening and the steering angle, and the change amount limitation of the target transfer clutch pressure upon termination is obtained.

FIG. 5 illustrates an example of the upon-termination target-hydraulic-pressure change limitation amount map. In FIG. 5, the horizontal axis (row) represents the steering angle (degrees), and the vertical axis (column) represents the accelerator pedal opening (degrees). In the upon-termination target-hydraulic-pressure change limitation amount map, a change amount limitation of the target transfer clutch pressure upon termination is given for each combination (lattice point) of the accelerator pedal opening and the steering angle. In the upon-termination target-hydraulic-pressure change limitation amount map, an ordinary value (relatively large value) is set in a range outside a range (conditions) in which the transfer clutch pressure reduction process is to be performed (for example, in a range where the steering angle is less than 250 degrees). On the other hand, in the range (conditions) in which the transfer clutch pressure reduction process is to be performed (for example, in a range where the steering angle is greater than or equal to 250 degrees), the change (increase) amount limitation of the target transfer clutch pressure upon termination is set such that it increases as the accelerator pedal opening increases. Thus, as the accelerator pedal opening becomes larger, the target hydraulic pressure is returned to the ordinary target hydraulic pressure more quickly.

The idle up determining/requesting unit 72 performs an idle up process if the steering angle is further increased in a state where the above-described abnormal noise (rattling noise) occurrence conditions are met. More specifically, if conditions (second conditions) that (1) the predetermined period has passed from when the accelerator pedal opening has become less than the predetermined opening, (2) the vehicle speed is within the predetermined speed range (is greater than or equal to the first predetermined vehicle speed and is less than the second predetermined vehicle speed), (3) the deviation (absolute value) between the engine revolution speed and the turbine revolution speed is less than the predetermined revolution speed, and (4) the steering angle of the steering wheel 15 is greater than or equal to the second predetermined angle (360 degrees, for example) that is greater than the first predetermined angle are met, the idle up determining/requesting unit 72 adjusts the revolution speed of the engine 20 (idle revolution speed) such that the engine revolution speed becomes greater than the turbine revolution speed.

When increasing the revolution speed of the engine 20, the idle up determining/requesting unit 72 increases an amount of increase in the engine revolution speed (idle revolution speed) as the vehicle speed increases. More specifically, a map (idle up revolution speed map) that determines a relationship among the vehicle speed (km/h), the steering angle (degrees), and the idle up revolution speed (rpm) is stored in the ROM or the like of the TCU 70. This idle up revolution speed map is searched on the basis of the vehicle speed and the steering angle, and the idle up revolution speed is obtained.

FIG. 6 illustrates an example of the idle up revolution speed map. In FIG. 6, the horizontal axis (row) represents the steering angle (degrees), and the vertical axis (column) represents the vehicle speed (km/h). In the idle up revolution speed map, an idle up revolution speed is given for each combination (lattice point) of the vehicle speed and the steering angle. In the idle up revolution speed map, in a range outside the range (conditions) in which the idle up process is to be performed (for example, in a range where the vehicle speed is less than 8 km/h, the steering angle is less than 360 degrees), the ordinary value (value without the idle up) is set. On the other hand, in the range (conditions) in which the idle up process is to be performed (for example, in a range where the vehicle speed is greater than or equal to 8 km/h and the steering angle is greater than or equal to 360 degrees), the idle up revolution speed (increase) is set such that it increases as the vehicle speed increases.

The idle up determining/requesting unit 72 adds the obtained idle up revolution speed to the turbine revolution speed to obtain a requested (target) idle revolution speed and transmits the requested (target) idle revolution speed to the ECU 80 via the CAN 100. At that time, an upper limit (for example, 1500 rpm) may be set for the revolution speed. As described above, in response to receipt of the request (idle up request) for increasing the engine revolution speed (idle revolution speed), the ECU 80 increases the opening of the electronically controlled throttle valve 85 (that is, increases the amount of intake air) on the basis of the requested (target) idle revolution speed to increase the engine revolution speed (idle revolution speed). That is, the ECU 80 performs the idle up process. Accordingly, in one implementation, the idle up determining/requesting unit 72 and the ECU 80 serve as an "engine controller" and/or a "controller" recited in the claims.

Figure 2:
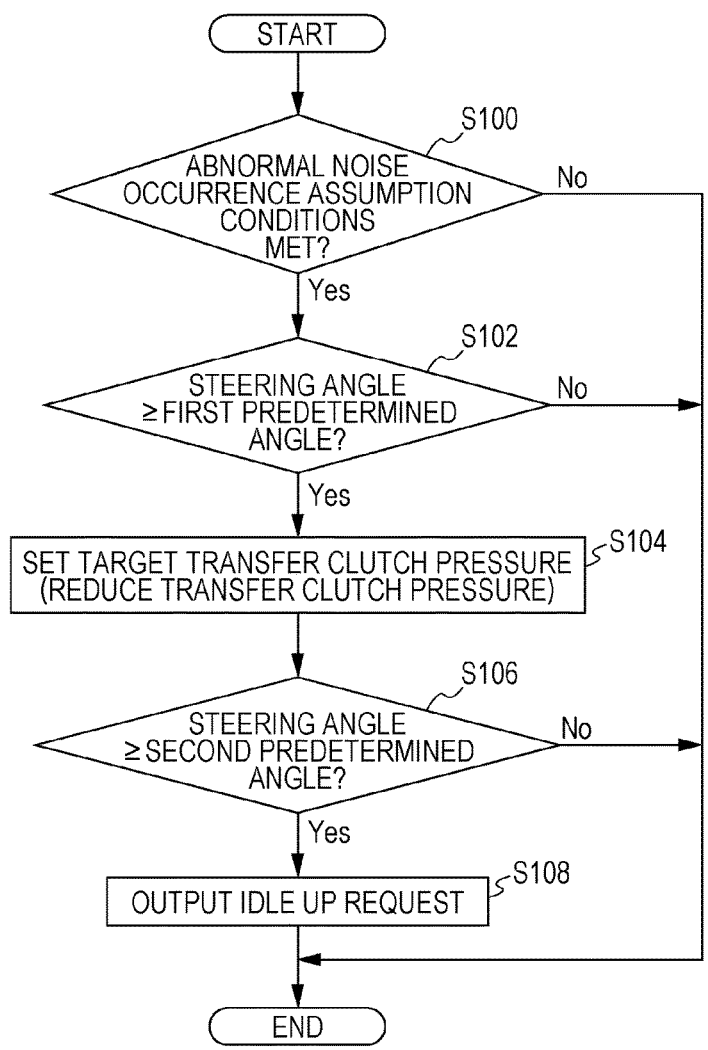
FIG. 2 is a flowchart illustrating a procedure of an abnormal noise (rattling noise) reduction process (including a transfer clutch pressure reduction process and an idle up process) performed by the AWD-vehicle control device according to the example.

An operation of the AWD-vehicle control device 1 will be described next with reference to FIG. 2. FIG. 2 is a flowchart illustrating a procedure of the abnormal noise (rattling noise) reduction process (including the transfer clutch pressure reduction process and the idle up process) performed by the AWD-vehicle control device 1. This process is iteratively performed mainly by the TCU 70 at predetermined timings.

In step S100, it is determined whether the predetermined abnormal noise (rattling noise) occurrence assumption conditions are met on the basis of the traveling state of the AWD vehicle 4. More specifically, it is determined whether a predetermined period has passed from when the accelerator pedal opening has become less than the predetermined opening, whether the vehicle speed is within a predetermined speed range (is greater than or equal to the first predetermined vehicle speed and is less than the second predetermined vehicle speed), and whether a deviation (absolute value) between the engine revolution speed and the turbine revolution speed is less than a predetermined revolution speed. If all the abnormal noise occurrence assumption conditions are met, the process proceeds to step S102 (see a timing t3 in FIG. 3 described later). On the other hand, if at least one condition of the abnormal noise occurrence assumption conditions is not met, the process ends this time.

In step S102, it is determined whether the steering angle of the steering wheel 15 is greater than or equal to the first predetermined angle. If the steering angle of the steering wheel 15 is greater than or equal to the first predetermined angle, the process proceeds to step S104. On the other hand, if the steering angle of the steering wheel 15 is less than the first predetermined angle, the process ends this time.

In step S104, the hydraulic pressure is controlled so that the coupling force of the transfer clutch 41 is reduced compared with the coupling force in the case where the at least one of conditions is not met (the ordinary case), that is, the transfer clutch pressure reduction process is performed (see timings t3 to t7 in FIG. 3 described later). Since the method for setting the hydraulic pressure (target hydraulic pressure) supplied to the transfer clutch 41 is as described above, a detailed description thereof is omitted.

In step S106, it is determined whether the steering angle of the steering wheel 15 is greater than or equal to the second predetermined angle (> the first predetermined angle). If the steering angle of the steering wheel 15 is greater than or equal to the second predetermined angle (see the timing t5 in FIG. 3 described later), the process proceeds to step S108. On the other hand, if the steering angle of the steering wheel 15 is less than the second predetermined angle, the process ends this time.

In step S108, the engine revolution speed (idle revolution speed) is adjusted so that the revolution speed of the engine 20 becomes greater than the turbine revolution speed. That is, the idle up request is output to the ECU 80 from the TCU 70 via the CAN 100, and the ECU 80 increases the engine revolution speed (idle revolution speed), that is, performs the idle up process (see the timings t5 to t7 in FIG. 3 described later). As described above, when the engine revolution speed is increased, the amount of increase in the engine revolution speed (idle revolution speed) is increased as the vehicle speed increases. In addition, when the hydraulic pressure is controlled to reduce the coupling force of the transfer clutch 41, if the steering angle of the steering wheel 15 is greater than or equal to the second predetermined angle, an amount of reduction in the hydraulic pressure of the transfer clutch 41 is reduced as the steering angle increases (see the timings t5 to t7 in FIG. 3 described later).

Then, the process ends this time. When the transfer clutch pressure reduction process is finished (terminated), the target hydraulic pressure is gradually returned to the ordinary pressure. At that time, an amount (increase) by which the target hydraulic pressure is returned per unit time is increased as the accelerator pedal opening increases (see the timings t7 and t8 in FIG. 3 described later).

Figure 3:
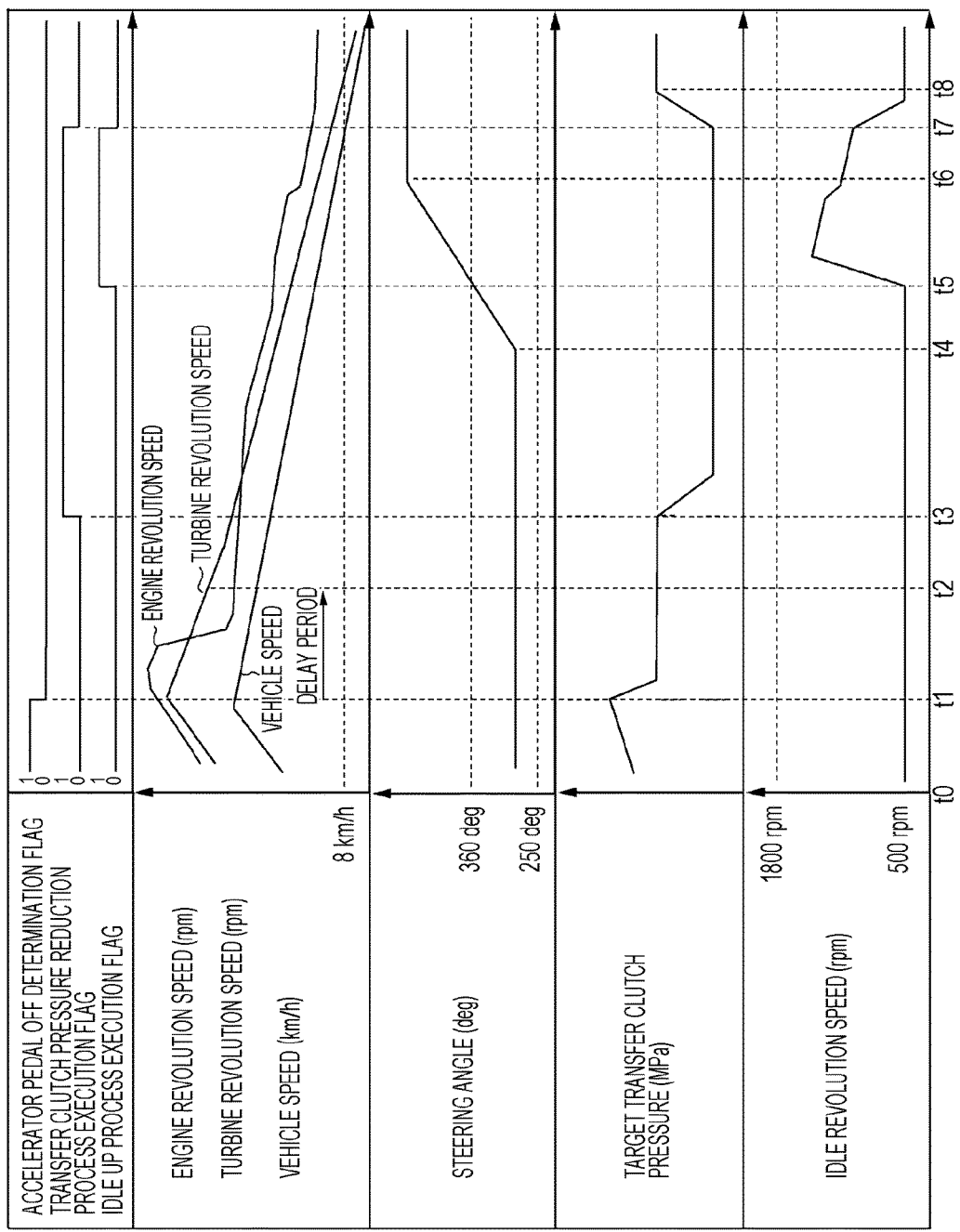
FIG. 3 is a timing chart illustrating an example of changes in an engine revolution speed, a turbine revolution speed, a vehicle speed, a steering angle, a target transfer clutch pressure, and a requested (target) idle revolution speed when an abnormal noise (rattling noise) reduction process is performed in response to steering during coasting.

FIG. 3 illustrates an example (timing chart) of changes in the engine revolution speed, the turbine revolution speed, the vehicle speed, the steering angle, the target transfer clutch pressure, and the requested (target) idle revolution speed when the abnormal noise (rattling noise) reduction process (including the transfer clutch pressure reduction process and the idle up process) is performed in accordance with the above flowchart in response to steering during coasting. In FIG. 3, the horizontal axis represents time, and the vertical axis represents, sequentially from the top, an accelerator pedal off determination flag (0 indicates the accelerator-pedal off state), a transfer clutch pressure reduction process execution flag (1 indicates executing), an idle up process execution flag (1 indicates executing), the engine revolution speed, the turbine revolution speed, the vehicle speed, the steering angle, the target transfer clutch pressure, and the requested (target) idle revolution speed.

In the example illustrated in FIG. 3, an accelerator pedal is released (accelerator pedal off) at a timing t1, in response to which the vehicle speed is started to reduce. Note that if the lockup is released when the accelerator pedal is set in the off state, the engine revolution speed fluctuates. The start of the abnormal noise reduction process is delayed for a predetermined period (until the delay period passes) since the accelerator pedal is set in the off state in order to avoid execution of the abnormal noise reduction process in a range where a difference (deviation) between the engine revolution speed and the turbine revolution speed decreases for the first time since the accelerator pedal off. Since the method for setting the predetermined period (delay period) is as described above, a detailed description thereof is omitted.

Then, at a timing t2, the predetermined period (delay period) passes. However, after the timing t2 and before the timing t3, the abnormal noise occurrence conditions (first conditions) are not met (the state is not in the abnormal noise occurrence range). Then, at the timing t3, the vehicle speed decreases and the difference (deviation) between the engine revolution speed and the turbine revolution speed becomes less than the predetermined revolution speed. Thus, it is determined that the abnormal noise occurrence conditions are met (the state is in the abnormal noise occurrence range), and the abnormal noise reduction process (the transfer clutch pressure reduction process) is started. Since the method for setting the target hydraulic pressure when the transfer clutch pressure is reduced is as described above, a detailed description thereof is omitted.

Then, at the timing t4, the steering wheel 15 is further operated, and consequently the steering angle increases. At the timing t5, upon the steering angle becoming greater than or equal to the second predetermined angle (> the first predetermined angle), the idle up process is started. Since the method for setting the requested (target) idle up revolution speed when the idle up request is made is as described above, a detailed description thereof is omitted. In response to the start of the idle up process, a hydraulic pressure reduction amount of the transfer clutch pressure is reduced.

Then, at the timing t6, the operation of the steering wheel 15 is stopped, and consequently the increase in the steering angle stops. Then, at the timing t7, when the vehicle speed becomes less than 8 km/h, the abnormal noise reduction process (the transfer clutch pressure reduction process and the idle up process) is finished (terminated), and a process for returning to the ordinary control (the ordinary transfer clutch pressure and the ordinary idle revolution speed) is performed. At that time, the transfer clutch pressure is gradually increased to the ordinary pressure. However, as the depression amount of the accelerator pedal becomes larger, an amount by which the transfer clutch pressure is increased per unit time is set to be larger. Since the method for setting the increase amount is as described above, a detailed description thereof is omitted. Then, at the timing t8, the process for returning to the ordinary control (the ordinary transfer clutch pressure and the ordinary idle revolution speed) is completed.

As described in detail above, in accordance with this example, if conditions (first conditions) that (1) the predetermined period has passed from when the accelerator pedal opening has become less than the predetermined opening, (2) the vehicle speed is within the predetermined speed range (is greater than or equal to the first predetermined vehicle speed and is less than the second predetermined vehicle speed), (3) the deviation (absolute value) between the engine revolution speed and the turbine revolution speed is less than the predetermined revolution speed, and (4) the steering angle of the steering wheel 15 is greater than or equal to the first predetermined angle are met, the hydraulic pressure is controlled so that the coupling force of the transfer clutch 41 decreases. That is, for example, in a state where the accelerator pedal is released (in the accelerator-pedal off state) and torque applied to the gear of the driveline is substantially equal to zero (that is, the backlash of the gear is reduced toward neither the drive side nor the coast side), if a difference in revolution speed occurs between the front wheels 10FL and 10FR and the rear wheels 10RL and 10RR in response to steering on the steering wheel 15, the hydraulic pressure is adjusted to reduce the coupling force of the transfer clutch 41. Thus, the hydraulic pressure fluctuation (hydraulic vibration) of the transfer clutch 41 is reduced, and a fluctuation in the transfer torque of the transfer clutch 41 is reduced (electromotive force is reduced), which reduces gear rattling noise (abnormal noise). As a result, abnormal noise (rattling noise) that can be produced by the gear of the driveline included in the CVT 30 in the state where the accelerator pedal is released (is in an accelerator-pedal off state) can be reduced.

In accordance with this example, if a condition (second condition) that the steering angle of the steering wheel 15 is greater than or equal to the second predetermined angle that is greater than the first predetermined angle is met in addition to the above-described conditions (first conditions), the engine revolution speed (idle revolution speed) is adjusted so that the revolution speed of the engine 20 becomes greater than the turbine revolution speed. Thus, as a result of the torque being added to the gear of the driveline from the engine 20, the state where the torque applied to the gear of the driveline is substantially equal to zero is avoided, and the gear rattling noise (abnormal noise) is reduced. If the transfer clutch pressure is reduced too much, for example, a shock may occur when the accelerator pedal is depressed thereafter (when the accelerator pedal is set to the on state). The rattling noise (abnormal noise) can be prevented by increasing the idle revolution speed of the engine 20 (performing the idle up process) as described above; however, creeping acceleration may become large in a state where the steering amount of the steering wheel 15 (that is, steering amounts of the front wheels 10FL and 10FR) is small because the traveling load applied by the steering is small. Thus, in a range from the steering amount at which abnormal noise occurs to the steering amount at which creeping acceleration does not become large (the steering amount that is greater than or equal to the first predetermined angle and is less than the second predetermined angle), hydraulic pressure of the transfer clutch 41 is reduced to suppress abnormal noise. In addition, when the steering amount is greater than or equal to the amount at which the creeping acceleration does not become large (when the steering amount is greater than or equal to the second predetermined angle), abnormal noise can be prevented by making an idle up request. Thus, abnormal noise (rattling noise) that can be produced by the gear of the driveline can be reduced while preventing overrunning due to an increased creeping force resulting from idle up at the time of steering during coasting.

In accordance with this example, when the revolution speed of the engine 20 is increased, an increase amount of the engine revolution speed is increased as the vehicle speed increases. Thus, it is possible to prevent an uncomfortable feeling resulting from overrunning (outputting of too much driving force) at the time of steering during coasting that can occur due to an increase in the creeping force in response to an increase (idle up) in the idle revolution speed of the engine 20, while adding toque to the gear of the driveline (while avoiding the state where torque applied to the gear of the driveline is substantially zero) for sure.

In accordance with this example, when the hydraulic pressure is controlled to reduce the coupling force of the transfer clutch 41, the target value of the hydraulic pressure (target hydraulic pressure) is set on the basis of the steering angle of the steering wheel 15 and the vehicle speed. Thus, the target value of the transfer clutch pressure (target hydraulic pressure) can be set appropriately.

In accordance with this example, if the steering angle of the steering wheel 15 is greater than or equal to the second predetermined angle (> the first predetermined angle) when the hydraulic pressure is controlled to reduce the coupling force of the transfer clutch 41, the reduction amount of the hydraulic pressure of the transfer clutch 41 is reduced as the steering angle becomes larger. As described above, when the steering angle of the steering wheel 15 is greater than or equal to the second predetermined angle, the revolution speed of the engine 20 is set to be greater than the turbine revolution speed. Thus, even if the reduction amount of the hydraulic pressure of the transfer clutch 41 is reduced, abnormal noise (rattling noise) does not become louder. Therefore, the AWD performance can be exhibited and abnormal noise (rattling noise) can be reduced.

In accordance with this example, when the transfer clutch pressure reduction process is terminated, the returning amount (increase amount) of the hydraulic pressure of the transfer clutch 41 is increased as the opening of the accelerator pedal increases. Therefore, for example, even if the accelerator pedal is depressed thereafter, re-acceleration can be handled quickly.

In accordance with this example, the predetermined period (delay period) is set to be longer as the vehicle speed becomes higher. Thus, starting of the abnormal noise (rattling noise) reduction process is avoided for sure in the operation range in which the deviation (absolute value) between the engine revolution speed and the turbine revolution speed becomes less than the predetermined revolution speed for the first time after the accelerator pedal opening has become less than the predetermined opening (after the accelerator pedal has been set to the off state).

While the example of the present invention has been described above, the present invention is not limited to the example, and various modifications can be made. For instance, in the example above, hydraulic pressure supplied to the transfer clutch 41 is reduced and the idle revolution speed is increased in order to reduce abnormal noise (rattling noise). Instead of (or in addition to) these method, the gear ratio of the CVT 30 may be controlled so that the engine revolution speed becomes greater than the turbine revolution speed. In such a case, the TCU 70 controls the gear ratio so that the engine revolution speed becomes greater than the turbine revolution speed, if the conditions (first conditions) that (1) the predetermined period has passed since the accelerator pedal opening has become less than the predetermined opening, (2) the vehicle speed is within the predetermined speed range (is greater than or equal to the first predetermined vehicle speed and is less than the second predetermined vehicle speed), (3) the deviation (absolute value) between the engine revolution speed and the turbine revolution speed is less than the predetermined revolution speed, and (4) the steering angle of the steering wheel 15 is greater than or equal to the first predetermined angle are met. That is, when low return control is performed at the time of deceleration, control is performed so that the slope of low return becomes gentler (so that the slope is located on a higher side than that of the ordinary case). In one implementation, the TCU 70 serves as a gear ratio controller.

With such a configuration, toque is added to the gear of the driveline included in the CVT 30 from the engine 20. Thus, the state where the torque applied to the gear of the driveline is substantially equal to zero is avoided and gear rattling noise (abnormal noise) is reduced. As a result, abnormal noise (rattling noise) that can be produced by the gear of the driveline in the state where the accelerator pedal is released (in the accelerator-pedal off state) can be reduced.

In addition, in the example described above, when the first conditions are met, hydraulic pressure supplied to the transfer clutch 4 is reduced, and when the second condition is met, the idle revolution speed is increased. When the second condition is met, instead of increasing the idle revolution speed, the gear ratio of the CVT 30 may be controlled as described above. Further, abnormal noise (rattling noise) may be reduced only by increasing the idle revolution speed or only by controlling (reducing) the hydraulic pressure supplied to the transfer clutch 41. Since details of the control are as described above, a detailed description thereof is omitted.

In the example described above, the case of using a chain CVT as an automatic transmission has been described. Instead of the chain CVT, for example, a belt CVT or a toroidal CVT may be used. In addition, instead of the CVT, stepped automatic transmission (AT) or the like may be used.

In addition, the above-described configuration of the drivetrain (for example, arrangements of the gears and the shafts, etc.) is illustrative and is not limited to the example above. Further, in the example above, a duty solenoid is used as the solenoid valve (electromagnetic valve) for adjusting the hydraulic pressure. Instead of the duty solenoid, for example, a linear solenoid or the like may also be used.

In addition, in the example above, control of the transfer clutch 41 is performed by the TCU 70. Alternatively, the control may be performed as a dedicated AWD controller that is independent from the TCU 70. Further, the system configuration is not limited to that of the example above (that is, the configuration in which the ECU 80 and the other control units are connected to one another via the CAN 100).

Further, in the example above, a state where the vehicle travels forward has been described for instance, the control is applicable when the vehicle travels backward. When the control is applied when the vehicle travels backward, the above-described settings such as the hydraulic pressure setting of the transfer clutch 41 and the idle up revolution speed setting may be changed.

Each of the TCU 70 and the ECU 80 illustrated in FIG. 1 can be implemented by circuitry including at least one semiconductor integrated circuit such as at least one processor (e.g., a central processing unit (CPU), at least one application specific integrated circuit (ASIC), and/or at least one field programmable gate array (FPGA)). At least one processor can be configured, by reading instructions from at least one machine readable tangible medium, to perform all or a part of functions of the TCU 70 including the transfer clutch control unit 71, the idle up determining/requesting unit 72, and the time measuring unit 73 and of the ECU 80. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the non-volatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG.1.

The invention claimed is:

1. A control device for an all-wheel-drive vehicle, the control device comprising:
   a transfer clutch configured to adjust a driving force transferred from an automatic transmission to a driven-wheel-side driveline;
   a steering angle detector configured to detect a steering angle of a steering wheel;
   an accelerator pedal opening detector configured to detect an opening of an accelerator pedal;
   a vehicle speed detector configured to detect a vehicle speed;
   an engine revolution speed detector configured to detect an engine revolution speed;
   a turbine revolution speed detector configured to detect a turbine revolution speed of a torque converter;
   a transfer clutch controller configured to adjust hydraulic pressure supplied to the transfer clutch by driving an electromagnetic valve on a basis of a vehicle operation state and control a coupling force of the transfer clutch, the transfer clutch controller being configured to control the hydraulic pressure to reduce the coupling force of the transfer clutch compared with a coupling force in a case where at least one of first conditions is not met in a case where the first conditions that a predetermined period has passed from the opening of the accelerator pedal becoming less than a predetermined opening, the vehicle speed is within a predetermined speed range, a deviation between the engine revolution speed and the turbine revolution speed is less than a predetermined revolution speed, and the steering angle of the steering wheel is greater than or equal to a first predetermined angle are met; and
   a controller configured to adjust the engine revolution speed to be greater than the turbine revolution speed in a case where second conditions that the predetermined period has passed from the opening of the accelerator pedal becoming less than the predetermined opening the vehicle speed is within the Predetermined speed range the, deviation between the engine revolution speed and the turbine revolution speed is less than the predetermined revolution speed, and the steering angle of the steering wheel is greater than or equal to a second predetermined angle that is greater than the first predetermined angle are met.

2. The control device according to claim 1, wherein when controlling the hydraulic pressure to reduce the coupling force of the transfer clutch, the transfer clutch controller sets a target value of the hydraulic pressure on a basis of the steering angle of the steering wheel and the vehicle speed.

3. The control device according to claim 1, wherein
   the controller is an engine controller configured to adjust the engine revolution speed, and
   the engine controller adjusts the engine revolution speed to make the engine revolution speed greater than the turbine revolution speed in a case where the second conditions are met.

4. The control device according to claim 3, wherein when increasing the engine revolution speed, the engine controller increases an increase amount of the engine revolution speed as the vehicle speed increases.

5. The control device according to claim 1, wherein
   the controller is a gear ratio controller configured to control a gear ratio of the automatic transmission, and
   the gear ratio controller controls the gear ratio of the automatic transmission to make the engine revolution speed greater than the turbine revolution speed in a case where the second conditions are met.

6. The control device according to claim 1, wherein when controlling the hydraulic pressure to reduce the coupling force of the transfer clutch, the transfer clutch controller reduces a reduction amount of the hydraulic pressure supplied to the transfer Clutch as the steering angle increases in a case where the steering angle of the steering wheel is greater than or equal to the second predetermined angle that is greater than the first predetermined angle.

7. The control device according to claim 1, wherein when finishing a process of controlling the hydraulic pressure to reduce the coupling force of the transfer clutch, the transfer clutch controller increases a returning amount of the hydraulic pressure supplied to the transfer clutch per unit time as the opening of the accelerator pedal increases.

8. The control device according to claim 1, wherein the predetermined period is set to be longer as the vehicle speed increases.

9. A control device for an all-wheel-drive vehicle including a transfer clutch configured to adjust a driving force transferred from an automatic transmission to a driven-wheel-side driveline, the control device comprising:
   a steering angle detector configured to detect a steering angle of a steering wheel;
   an accelerator pedal opening detector configured to detect an opening of an accelerator pedal;
   a vehicle speed detector configured to detect a vehicle speed;
   an engine revolution speed detector configured to detect an engine revolution speed;
   a turbine revolution speed detector configured to detect a turbine revolution speed of a torque converter; and
   a controller configured to perform adjustment to make the engine revolution speed greater than the turbine revolution speed in a case where third conditions that a predetermined period has passed from the opening of the accelerator pedal becoming less than a predetermined opening, the vehicle speed is within a predetermined speed range, a deviation between the engine revolution speed and the turbine revolution speed is less than a predetermined revolution speed, and the steering angle of the steering wheel is greater than or equal to a first predetermined angle are met.

10. The control device according to claim 9, wherein
the controller is an engine controller configured to adjust the engine revolution speed, and
the engine controller adjusts the engine revolution speed to make the engine revolution speed greater than the turbine revolution speed in a case where the third conditions are met.

11. The control device according to claim 10, wherein when increasing the engine revolution speed, the engine controller increases an increase amount of the engine revolution speed as the vehicle speed increases.

12. The control device according to claim 9, wherein
the controller is a gear ratio controller configured to control a gear ratio of the automatic transmission, and
the gear ratio controller controls the gear ratio of the automatic transmission to make the engine revolution speed greater than the turbine revolution speed in a case where the third conditions are met.

13. A control device for an all-wheel-drive vehicle, the control device comprising:
a transfer clutch configured to adjust a driving force transferred from an automatic transmission to a driven-wheel-side driveline;
a steering angle detector configured to detect a steering angle of a steering wheel;
an accelerator pedal opening detector configured to detect an opening of an accelerator pedal;
a vehicle speed detector configured to detect a vehicle speed;
an engine revolution speed detector configured to detect an engine revolution speed;
a turbine revolution speed detector configured to detect a turbine revolution speed of a torque converter; and
circuitry configured to
adjust hydraulic pressure supplied to the transfer clutch by driving an electromagnetic valve on a basis of a vehicle operation state and control a coupling force of the transfer clutch,
control the hydraulic pressure to reduce the coupling force of the transfer clutch compared with a coupling force in a case where at least one of first conditions is not met in a case where the first conditions that a predetermined period has passed from the opening of the accelerator pedal becoming less than a predetermined opening, the vehicle speed is within a predetermined speed range, a deviation between the engine revolution speed and the turbine revolution speed is less than a predetermined revolution speed, and the steering angle of the steering wheel is greater than or equal to a first predetermined angle are met, and
adjust the engine revolution speed to be greater than the turbine revolution speed in a case where second conditions that the predetermined period has passed from the opening of the accelerator pedal becoming less than the predetermined opening, the vehicle speed is within the predetermined speed range, the deviation between the engine revolution steed and the turbine revolution speed is less than the predetermined revolution speed, and the steering angle of the steering wheel is greater than or equal to a second predetermined angle that is greater than the first predetermined angle are met.

14. A control device for an all-wheel-drive vehicle including a transfer clutch configured to adjust a driving force transferred from an automatic transmission to a driven-wheel-side driveline, the control device comprising:
a steering angle detector configured to detect a steering angle of a steering wheel;
an accelerator pedal opening detector configured to detect an opening of an accelerator pedal;
a vehicle speed detector configured to detect a vehicle speed;
an engine revolution speed detector configured to detect an engine revolution speed;
a turbine revolution speed detector configured to detect a turbine revolution speed of a torque converter; and
circuitry configured to perform adjustment to make the engine revolution speed greater than the turbine revolution speed in a case where conditions that a predetermined period has passed from the opening of the accelerator pedal becoming less than a predetermined opening, the vehicle speed is within a predetermined speed range, a deviation between the engine revolution speed and the turbine revolution speed is less than a predetermined revolution speed, and the steering angle of the steering wheel is greater than or equal to a first predetermined angle are met.

15. A control device for an all-wheel-drive vehicle, the control device comprising:
a transfer clutch configured to adjust a driving force transferred from an automatic transmission to a driven-wheel-side driveline;
a steering angle detector configured to detect a steering angle of a steering Wheel;
an accelerator pedal opening detector configured to detect an opening of an accelerator pedal;
a vehicle speed detector configured to detect a vehicle speed;
an engine revolution speed detector configured to detect an engine revolution speed;
a turbine revolution speed detector configured to detect a turbine revolution speed of a torque converter; and
a transfer clutch controller configured to adjust hydraulic pressure supplied to the transfer clutch by driving an electromagnetic valve on a basis of a vehicle operation state and control a coupling force of the transfer clutch,
wherein in a case Where first conditions that a predetermined period has passed from the opening of the accelerator pedal becoming less than a predetermined opening, the vehicle speed is within a predetermined speed range, a deviation between the engine revolution speed and the turbine revolution speed is less than a predetermined revolution speed, and the steering angle of the steering wheel is greater than or equal to a first predetermined angle are met, the transfer clutch controller controls the hydraulic pressure to reduce the coupling force of the transfer clutch compared with a coupling force in a case where at least one of the first conditions is not met, and then, when finishing a process of controlling the hydraulic pressure to reduce the coupling force of the transfer clutch, the transfer clutch controller increases a returning amount of the hydraulic pressure supplied to the transfer clutch per unit time as the opening of the accelerator pedal increases.

16. A control device for an all-wheel-drive vehicle, the control device comprising:

a transfer clutch configured to adjust a driving force transferred from an automatic transmission to a driven-wheel-side driveline;

a steering angle detector configured to detect a steering angle of a steering wheel;

an accelerator pedal opening detector configured to detect an opening of an accelerator pedal;

a vehicle speed detector configured to detect a vehicle speed;

an engine revolution speed detector configured to detect an engine revolution speed;

a turbine revolution speed detector configured to detect a turbine revolution speed of a torque converter; and a transfer clutch controller configured to adjust hydraulic pressure supplied to the transfer clutch by driving an electromagnetic valve on a basis of a vehicle operation state and control a coupling force of the transfer clutch, wherein in a case where first conditions that a predetermined period has passed from the opening of the accelerator pedal becoming less than a predetermined opening, the vehicle speed is within a predetermined speed range, a deviation between the engine revolution speed and the turbine revolution speed is less than a predetermined revolution speed, and the steering angle of the steering wheel is greater than or equal to a first predetermined angle are met, the transfer clutch controller controls the hydraulic pressure to reduce the coupling force of the transfer clutch compared with a coupling force in a case where at least one of the first conditions is not met, and the predetermined period is set to be longer as the vehicle speed increases.

* * * * *